US011930799B2

(12) United States Patent
Kaminou et al.

(10) Patent No.: US 11,930,799 B2
(45) Date of Patent: Mar. 19, 2024

(54) GUIDE FRAME OF FISHING LINE GUIDE, FISHING LINE GUIDE AND FISHING ROD

(71) Applicant: Shimano Inc., Osaka (JP)

(72) Inventors: Yoshiyuki Kaminou, Osaka (JP); Kazuma Taniguchi, Osaka (JP)

(73) Assignee: Shimano Inc., Osaka (JP)

( * ) Notice: Subject to any disclaimer, the term of this patent is extended or adjusted under 35 U.S.C. 154(b) by 323 days.

(21) Appl. No.: 16/810,113

(22) Filed: Mar. 5, 2020

(65) Prior Publication Data

US 2020/0329687 A1    Oct. 22, 2020

(30) Foreign Application Priority Data

Apr. 19, 2019 (JP) ................................ 2019-080018

(51) Int. Cl.
*A01K 87/04* (2006.01)
(52) U.S. Cl.
CPC ..................................... *A01K 87/04* (2013.01)
(58) Field of Classification Search
CPC .................. A01K 87/04; A01K 87/002; A01K 89/01914; A01K 89/01121; A01K 89/0192; A01K 87/005; A01K 87/00; A01K 87/06

USPC .......................................... 43/24, 25, 18.5, 4
See application file for complete search history.

(56) References Cited

U.S. PATENT DOCUMENTS

| 2013/0167426 A1* | 7/2013 | Olguin | .................... | A01K 87/04 |
| | | | | 219/121.64 |
| 2016/0088821 A1* | 3/2016 | Omura | .................... | A01K 87/06 |
| | | | | 43/22 |

FOREIGN PATENT DOCUMENTS

| JP | 2001-238577 A | | 9/2001 | |
| JP | 2017038532 A | * | 2/2017 | ............. A01K 87/04 |
| JP | 6970006 B2 | * | 11/2021 | |

* cited by examiner

*Primary Examiner* — Jeffrey R Larsen
(74) *Attorney, Agent, or Firm* — Global IP Counselors, LLP (57) ABSTRACT

A guide frame of a fishing line guide includes a hollow frame body, and a core member inserted into at least a part of the frame body. The frame body includes a frame member configured to abut a prescribed angle region on a circumference of a guide ring, an attachment foots configured to attach to a fishing rod and a support leg configured to connect ends of the frame member and then attachment foots.

14 Claims, 11 Drawing Sheets

GUIDE FRAME OF FISHING LINE GUIDE, FISHING LINE GUIDE AND FISHING ROD

CROSS-REFERENCE TO RELATED APPLICATIONS

This application claims priority to Japanese Patent Application No. 2019-080018, filed on Apr. 19, 2019. The entire disclosure of Japanese Patent Application No. 2019-080018 is hereby incorporated herein by reference.

BACKGROUND

Field of the Invention

The present invention relates to a guide frame of a fishing line guide for guiding a fishing line, the fishing line guide and a fishing rod that includes the fishing line guide.

Background Art

A conventional fishing line guide can include a guide frame formed by punching out a metal plate and a guide ring that is attached to a hole of the guide frame and which guides the fishing line, as disclosed in Japanese Laid-Open Patent Application No. 2001-238577 described below, for example. However, since the guide frame is formed by a punch out, there can be limitations on weight reduction while ensuring sufficient strength of the guide frame.

SUMMARY

In light of the above limitations it has been determined that an improved guide frame for a fishing line guide is desired. One aspect of the present invention is to provide a guide frame of a fishing line guide that has a guide ring to guide a fishing line. The guide frame includes a hollow frame body and a core member. that are inserted at least in a part of the frame body. The frame body includes a frame member, an attachment foot and a support leg, with the frame member abutting a prescribed angle region on the entire circumference of the guide ring. The attachment foots are attached to a fishing rod, and the support leg connect both ends of the frame body in a circumferential direction and the attachment foots.

According to this configuration, the guide frame has a hollow frame body and a core member, and thus, it is possible to reduce the weight of the guide frame and to ensure the strength of the guide frame.

Preferably, the core member is inserted in a part of the supporting let parts.

Preferably, the support legs have curved portions, and the core members are inserted in the curved portions of the support legs.

Preferably, the core members are held at prescribed positions of the frame body due to the contact between the core member and the inner periphery of the frame body.

Preferably, the frame body has closed core portions and an open core portion. The closed core portions are where the core members are inserted in the frame body. The open core portion is where the core members are not inserted in the frame body.

Preferably, the frame member is an open core portion.

Preferably, the portions of the frame member side on the support legs are open core portions.

Preferably, the frame body has closed core portions on the parts near the attaching let parts of the support legs.

Preferably, the attachment foots are open core portions.

Preferably, the attachment foots are pressed in a flat shape.

Preferably, the material for the frame body and the material for the core members are different from each other.

Also, the fishing rod according to the present invention has a guide ring and the above-mentioned guide frame. The guide ring guides the fishing line.

Also, the fishing rod according to the present invention has the above-mentioned fishing line guide.

As described above, it is possible to reduce the weight of the guide frame and to ensure the strength of the guide frame.

DETAILED DESCRIPTION OF EMBODIMENTS

A fishing line guide 1 according to one embodiment of the present invention will be described below with reference to FIGS. 1 to 11. The fishing line guide 1 according to the present embodiment can include a guide ring 2 to directly guide a fishing line, a guide frame 3 that holds the guide ring 2 and is attached to a rod body 5 of a fishing rod and a spacer 4 that is engaged to the outer periphery of the guide ring 2.

Figure 11:
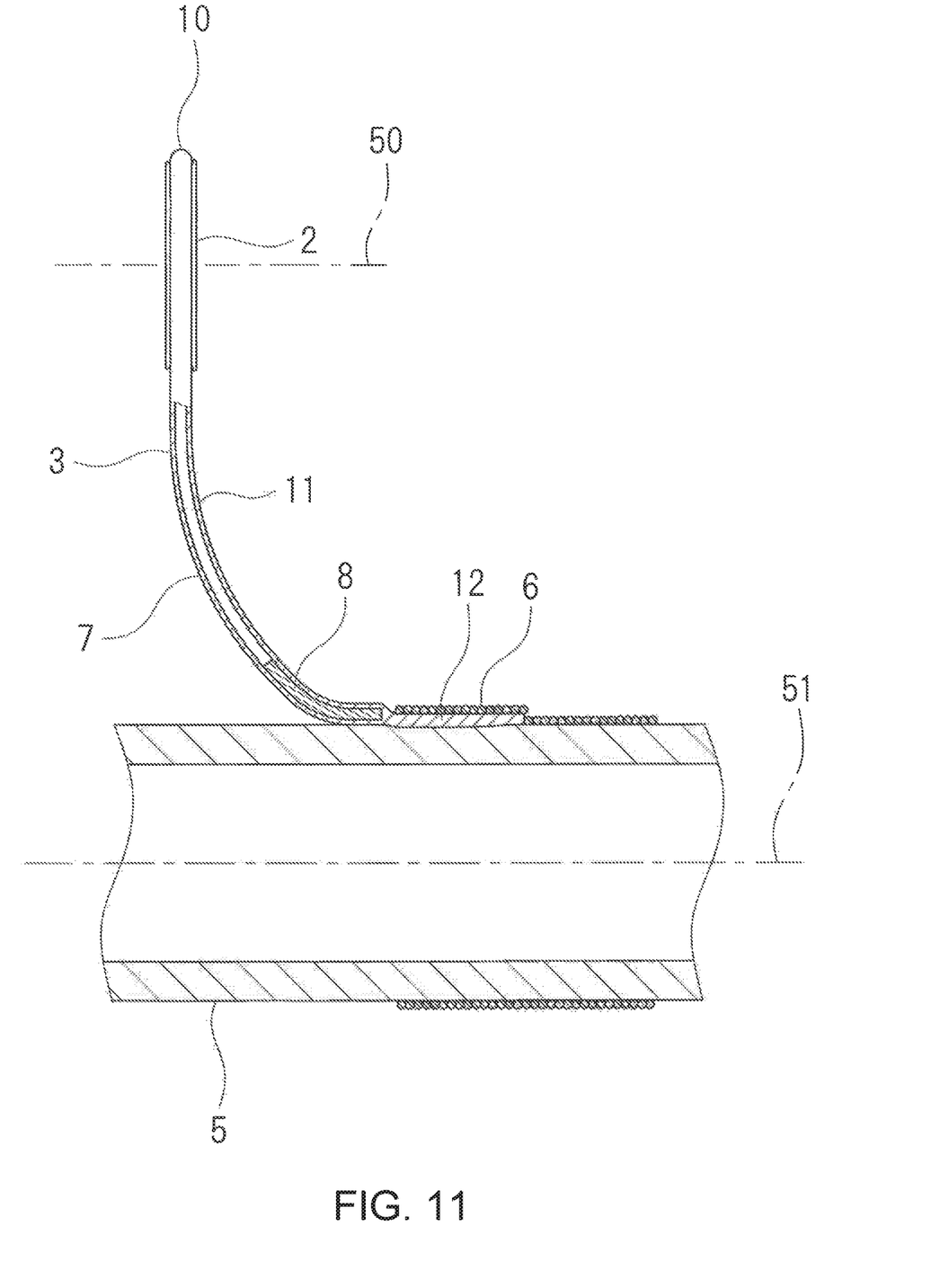
FIG. 11 is a cross-sectional view with a break line, showing the state in which the fishing line guide is attached to a fishing rod and corresponding to FIG. 9.

As shown in FIG. 11, the fishing line guide 1 can be fixed on the outer periphery of the rod body 5 of the fishing rod. The fishing line guide 1 is a fixed guide and is attached to and used on different kinds of fishing rods that include reel seats (not shown).

In the following description, the direction of the center line 51 of the fishing rod is referred to as the longitudinal direction, the rod tip side is referred to as the front side and the rod end side is referred to as the rear side. The radial direction of the fishing rod is the direction that radially extends from the outer periphery of the fishing rod. The upper side is the outer periphery of the fishing rod on which the fishing line guide 1 and the side that is opposite to the upper side is referred to as the lower side. The vertical direction is the direction perpendicular to the longitudinal direction on a plane surface that passes the center line 50 of the guide ring 2 and the center line 51 of the rod body 5. The direction perpendicular to the longitudinal direction and the vertical direction is referred to as the left-right direction. The left-right direction is the direction perpendicular to the longitudinal direction when the outer periphery of the fishing rod is viewed from the outside in the radial direction, and the circumferential direction of the outer periphery of the fishing rod. In the figures, the left-right direction is shown with an arrow X. The longitudinal direction is shown with arrows Y1, Y2 and the front side is shown with the arrow Y1 and the rear side is shown with the arrow Y2. The vertical direction is shown with arrows Z1, Z2 and the upper side is shown with the arrow Z1 and the lower side is shown with the arrow Z2.

FIG. 11 shows a state in which the fishing line guide 1 is located on the upper side of the rod body 5. However, in the actual conditions of use, the fishing line guide 1 can be located on the upper side or the lower side of the rod body 5. The position and the orientation of the fishing line guide 1 can be any suitable position and orientation. When using a spinning reel (not shown), for example, the spinning reel is usually located on the lower side of the rod body 5. In this situation, the fishing line guide 1 is located on the lower side of the rod body 5. When using a dual-bearing reel (not shown), the dual-bearing reel is usually located on the upper side of the rod body 5. In this situation, the fishing line guide 1 is located on the upper side of the rod body 5. Thus, the fishing line guide 1 can located on the same side as a reel in when disposed on the rod body 5.

Guide Ring 2

In the illustrated embodiment, the guide ring 2 is circular and annular, however, the guide ring 2 can be oval or elliptical. I In the present embodiment, the center line 50 of the guide ring 2 is parallel to the center line 51 of the rod body 5. However, the center line 50 of the guide ring 2 does not have to be parallel to the center line 51 of the rod body 5. For example, the guide ring 2 can be tilted towards the front side. The guide ring 2 can be made of different types of hard materials with excellent wear resistance. For example, the guide ring 2 of the present embodiment is made of titanium. However, the guide ring 2 can be ceramic represented by SiC (silicon carbide), for example.

The guide ring 2 is made of a bent thin metal sheet. Both the front and rear surfaces of the metal sheet are, respectively, the outer periphery and the inner periphery of the guide ring 2. The guide ring 2 is formed by pressing a metal plate which is punched into a prescribed shape (i.e., a doughnut shape), for example, so that the metal plate is transformed into a tubular shape. It is preferable that the thickness of the guide ring 2 is approximately the same as or thinner than that of a frame body 7 of the guide frame 3 which is described below.

Figure 8:
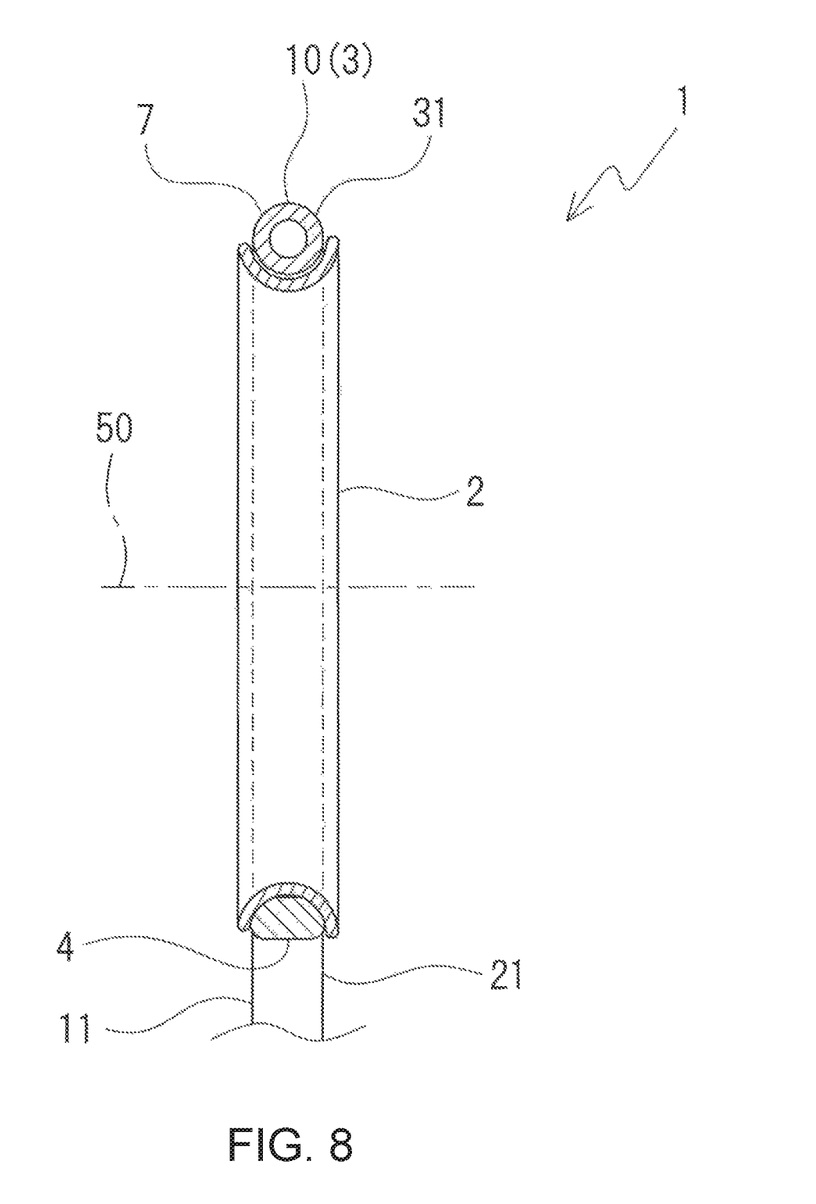
FIG. 8 is a cross-sectional view taken along line A-A in FIG. 3.
Figure 9:
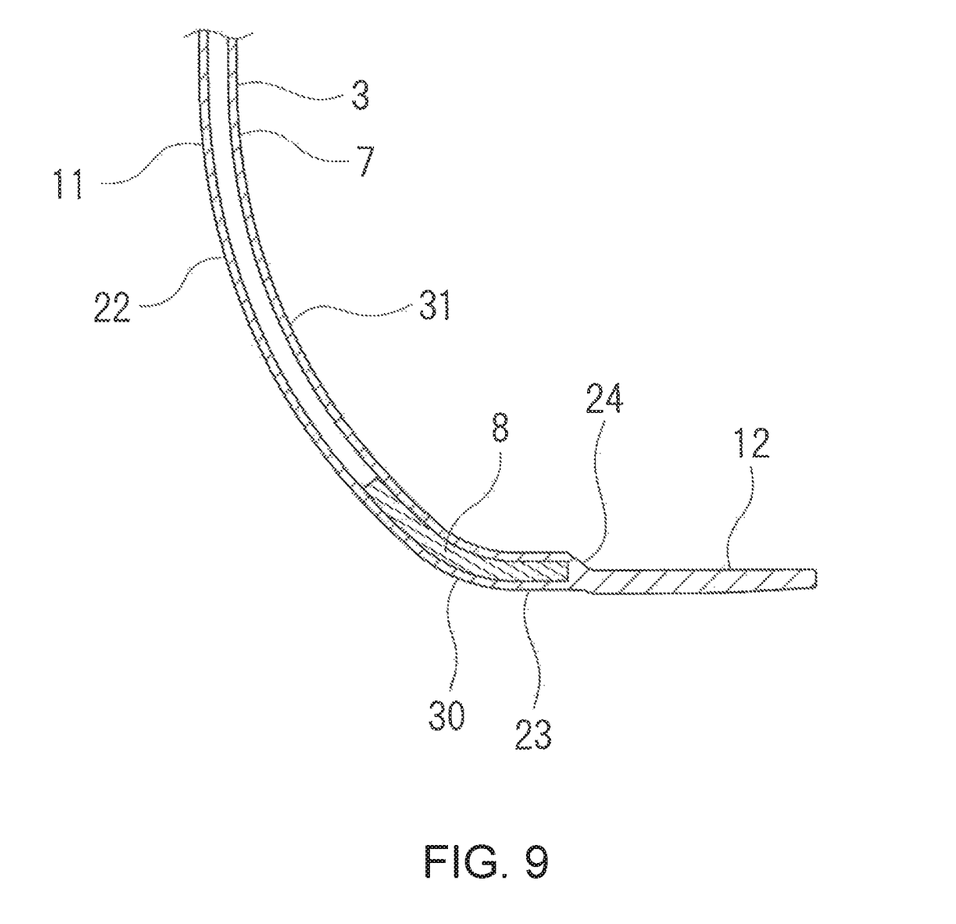
FIG. 9 is a cross-sectional view taken along line B-B in FIG. 3.
Figure 10A:
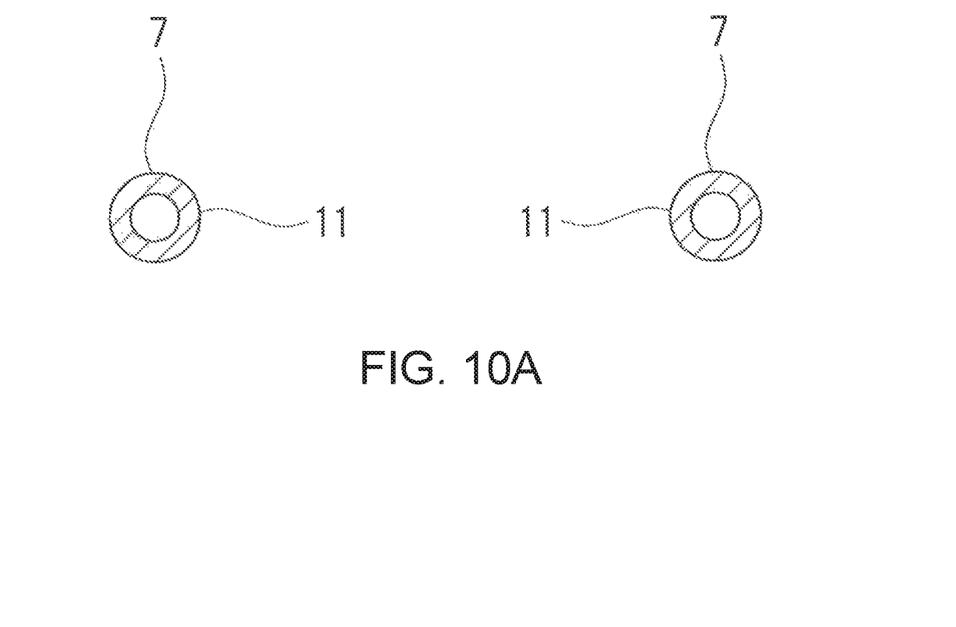
FIG. 10A is an end face view taken along line C-C in FIG. 7.
Figure 10B:
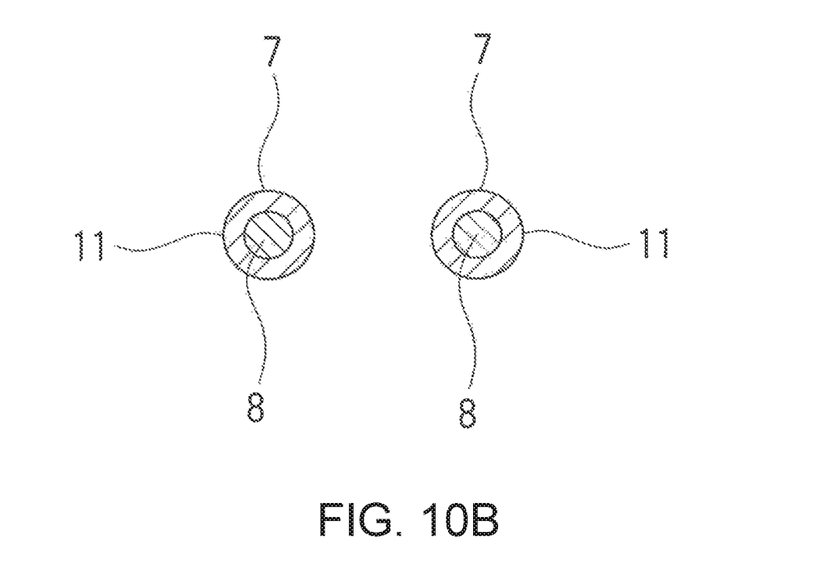
FIG. 10B is an end face view taken along line D-D in FIG. 7.

The guide ring 2 has a fishing line threading hole through which a fishing line can pass. The guide ring 2 directly guides the fishing line by enabling the fishing line to slide on the inner periphery of the guide ring 2. As shown in FIG. 8, the inner periphery of the guide ring 2 is a curved surface which is curved in the longitudinal direction so that the inner side (center side) of the inner periphery is convex in a cross-sectional view. The outer periphery of the guide ring 2 is also a curved surface which is curved in the longitudinal direction so that the inner side (center side) of the outer periphery is convex in a cross-sectional view. In other words, in a cross-sectional view obtained by cutting in the direction of the center line 50 of the guide ring 2, the guide ring 2 has a convex inner periphery curved in an arc such that the center side of the inner periphery is convex and a concave outer periphery curved in an arc such that the center side of the outer periphery is convex. The inner periphery and the outer periphery of the guide ring 2 can have shapes that mutually correspond to each other. A concave peripheral groove is formed over the entire circumference of the outer periphery of the guide ring 2. On the peripheral groove, a spacer 4 and a frame member 10 of the frame body 7 of the guide frame 3 which is described below, are engaged. The side rear end of the guide ring 2 has a larger diameter than the front side end of the guide ring 2.

Guide Frame 3

The guide frame 3 includes the hollow frame body 7 and the core member 8, which can be inserted at least in a part of the frame body 7. The core member 8 can be inserted into the frame body 7 through the entire length thereof or only a part of the entire length of the frame body 7. The frame body 7 includes the frame member 10, the support leg 11 and the attachment foot 12. The frame member 10 abuts a prescribed angle region (i.e., circumferential region) on the circumference of the guide ring 2. Then attachment foots 12 are configured to attach to the fishing rod. The support legs 11 connect both ends of the frame body 10 in the circumferential direction and the attachment foots 11.

Preferably, the frame body 7 is entirely hollow, and is composed of one hollow metal wire. Specifically, the frame body 7 is formed by bending the metal wire into U-shape to fit the outer diameter of the guide ring 2 so as to be bilaterally symmetric. The metal wire can be composed of titanium alloy, stainless or aluminum alloy, for example. From a standpoint of reduction in weight, titanium alloy is especially preferable out of these materials. The metal wire has a circular cross-sectional shape. The outer diameter of the metal wire is, for example, 0.3-6 mm, preferably, 1-3 mm. Both ends of the metal wire are located at the rear end of the attachment foots 12, and both ends of the metal wire are aligned towards the rear side. Both support legs 11 and the attachment foots 12 are configured such that two metal wires are aligned side-by-side.

Frame Member 10

The frame member 10 holds the guide ring 2 of the frame body 7, and is disposed above the support legs 11. The frame member 10 is formed in an arc (i.e., is a curved portion) which has a prescribed central angle. That is, the frame member 10 is formed in a C-shape which is open at the lower side. The size and the shape of the frame member 10 corresponds to the guide ring 2. The frame member 10 abuts the prescribed angle range only, which is located on the upper side of the entire circumference of the guide ring 2. It is preferable that the central angle of the frame member 10 is over 180°. The metal wire of the frame member 10 is not pressed, and preferably maintains a circular cross-sectional shape.

Supporting Leg Part 11

The support legs 11 connect the frame member 10 and the attachment foots 12. It is preferable that the support legs 11 have curved portions. The support legs 11 form a side-by-side pair of left and right a support leg 11 that are bilaterally symmetric. The pair of a support leg 11 connect both ends of the frame body 10 in the circumferential direction and the attachment foots 12. The shape of the pair of the support legs 11 in the front view and in the rear view is described herein. The front view is the state in which the guide frame 3 is viewed from the front, as in FIG. 3. The rear view is the state in which the guide frame 3 is viewed from the rear, as in FIG. 4. The pair of support legs 11 have V-shape in the front view or in the rear view. The distance between the pair of support legs 11 in the left-right direction gradually increases from the attachment foots 12 towards the frame member 10. In the front view or in the rear view, the pair of support legs 11 extend in a substantially straight line without curving in the left-right direction, from the attachment foots 12 towards the frame member 10. The root portion of the pair of support legs 11 approach each other with a slight gap therebetween, or contact each other.

Figure 1:
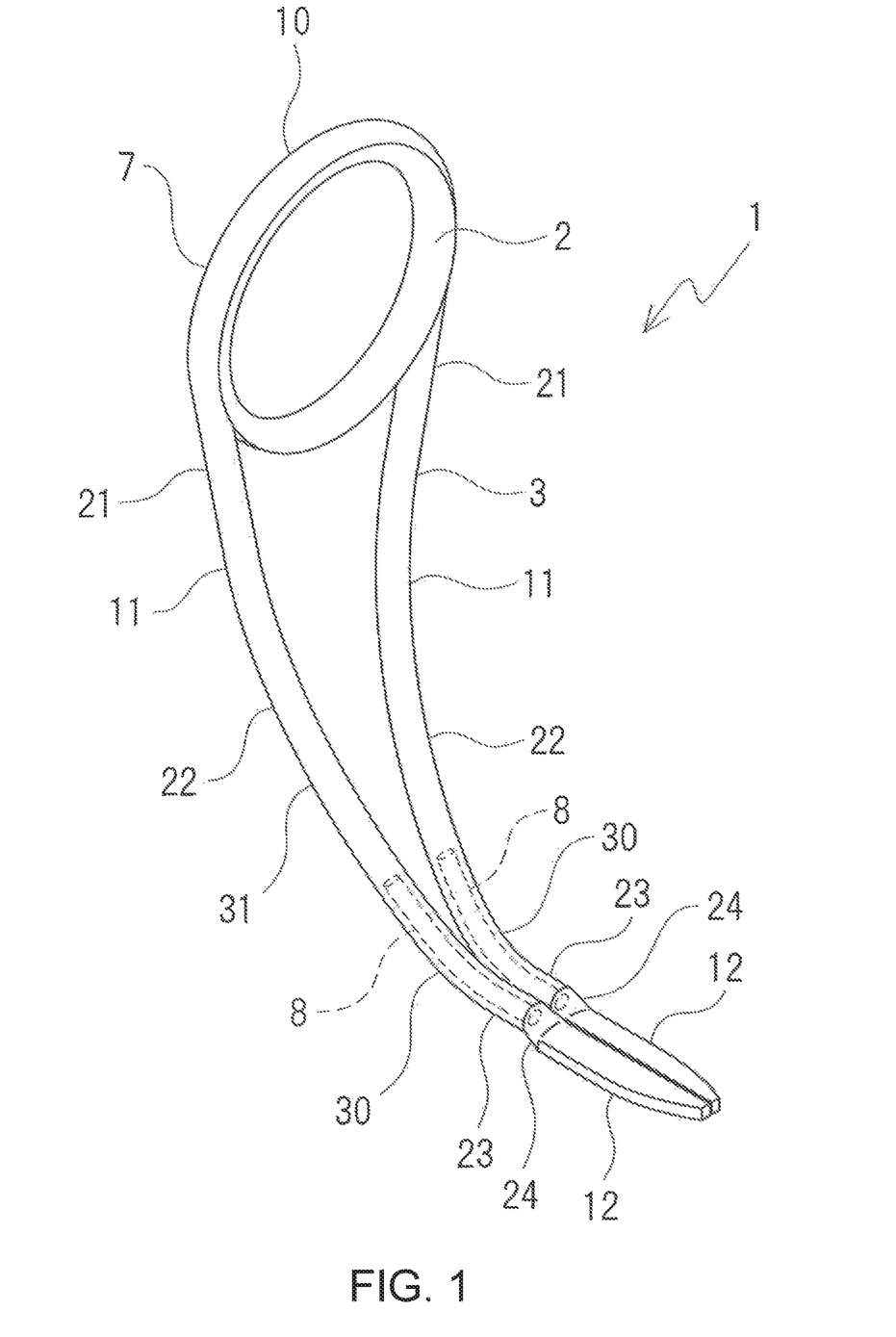
FIG. 1 is a rear perspective view of a fishing line guide according to one embodiment of the present invention.
Figure 2:
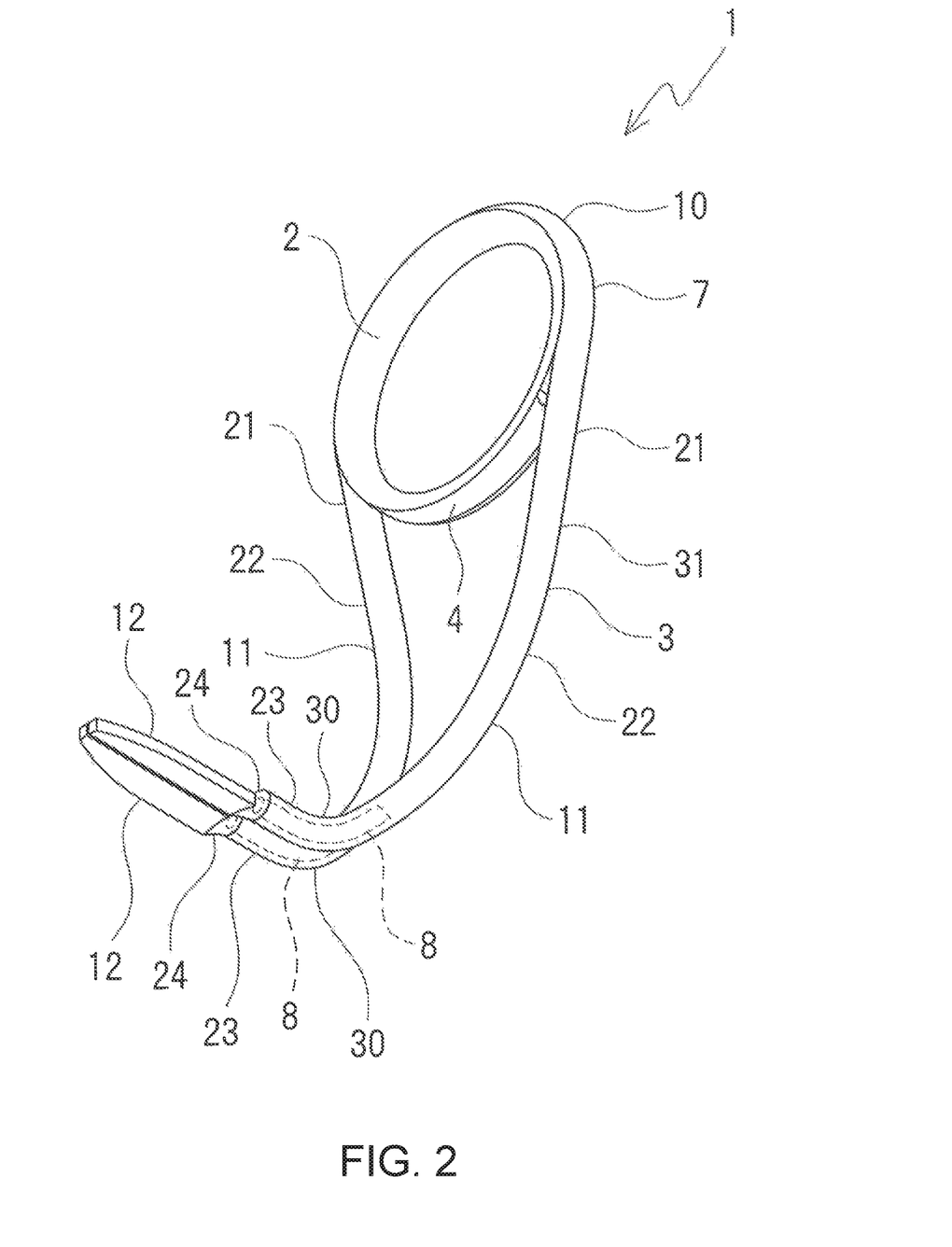
FIG. 2 is a front perspective view of the fishing line guide of FIG. 1.
Figure 3:
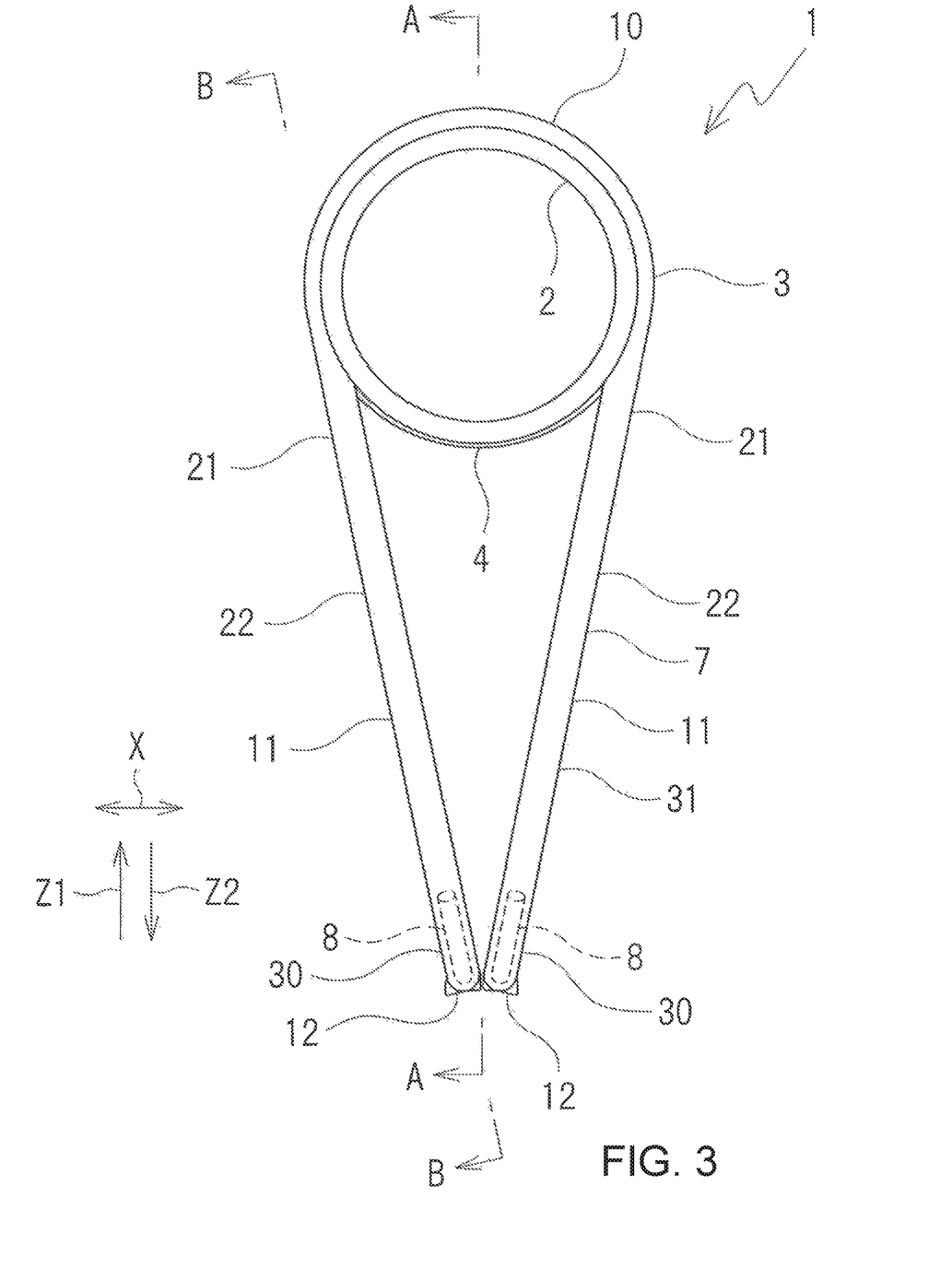
FIG. 3 is a front view of the fishing line guide of FIG. 1.
Figure 4:
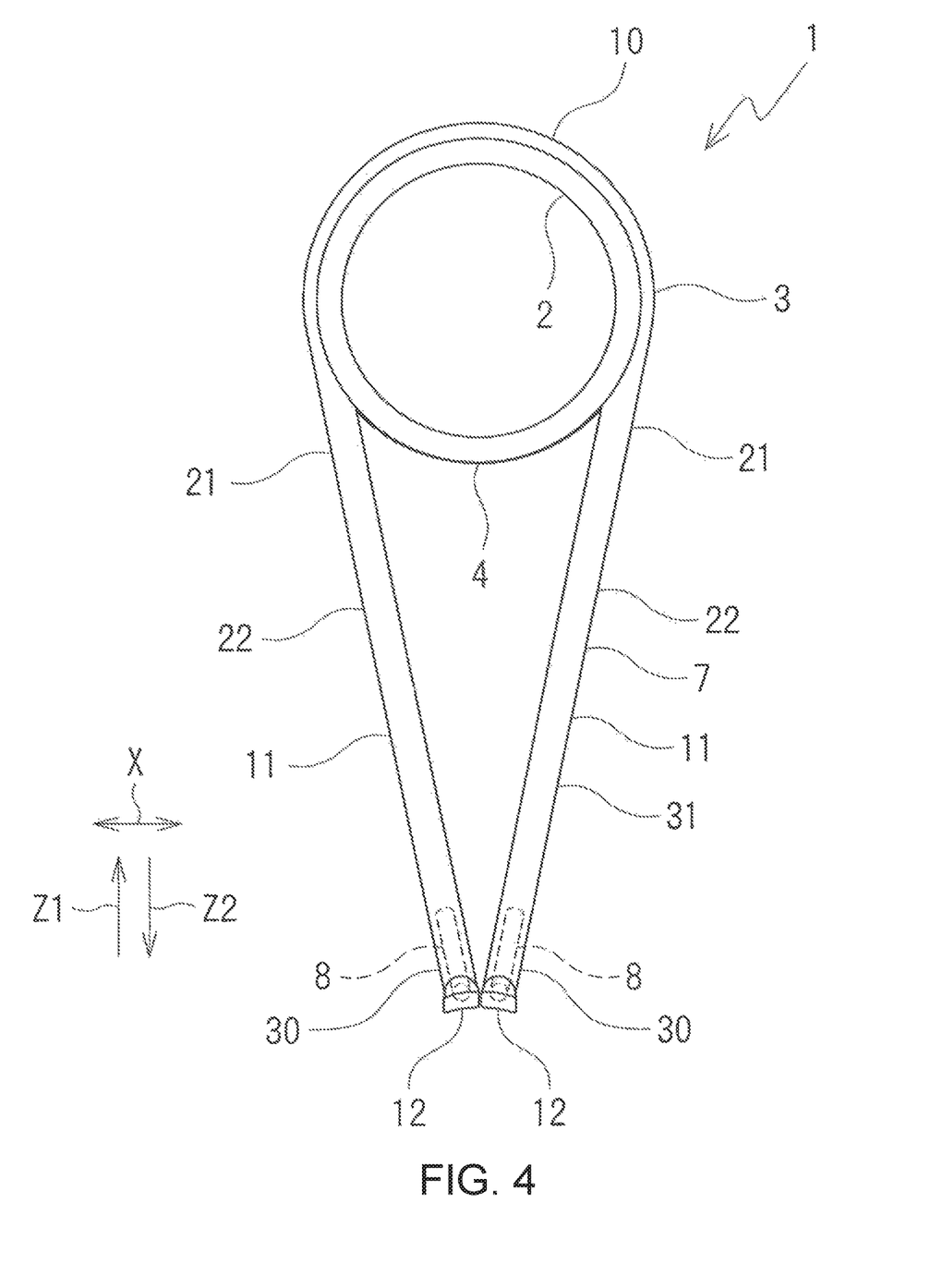
FIG. 4 is a rear view of the fishing line guide of FIG. 1.
Figure 5:
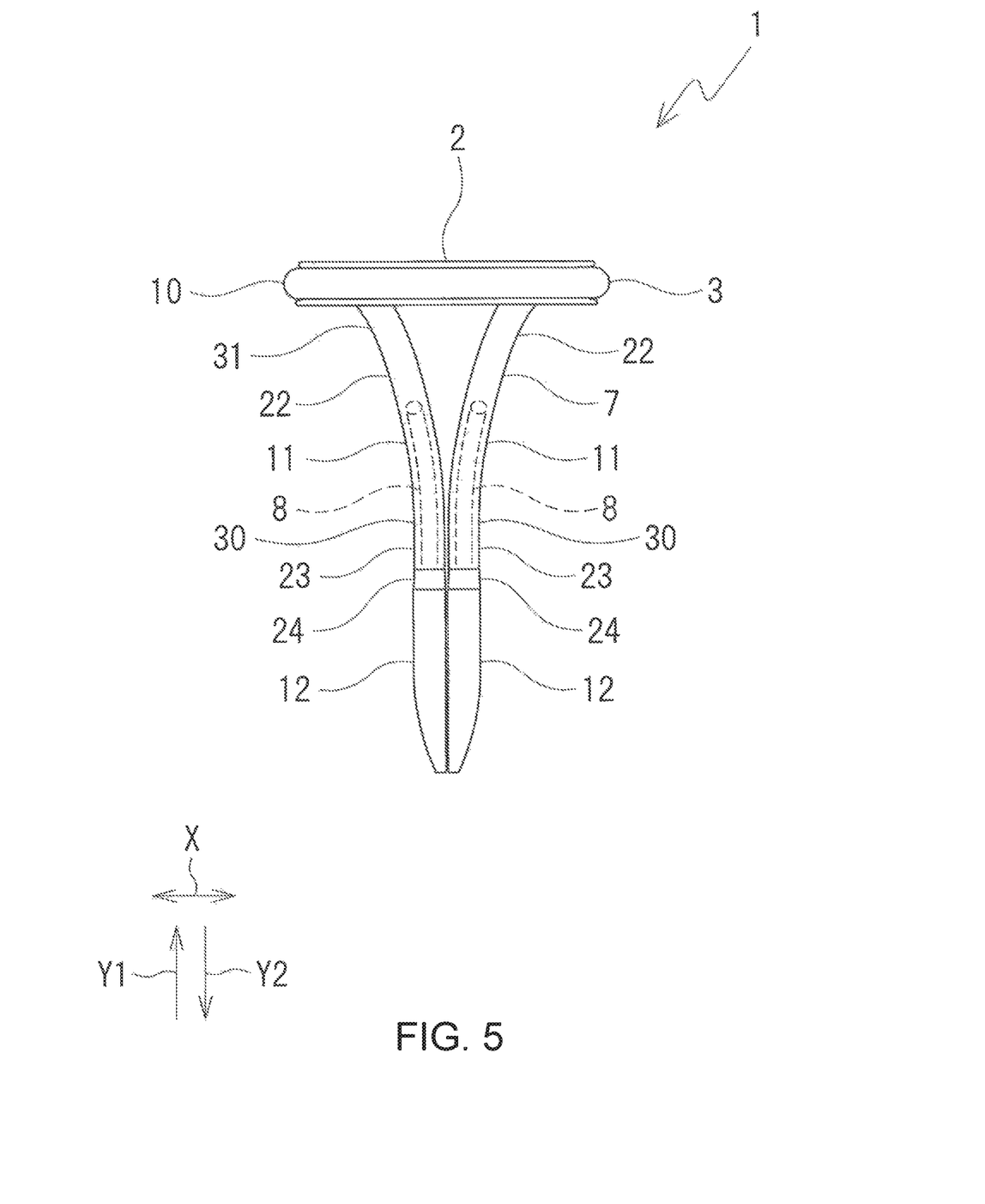
FIG. 5 is a plan view of the fishing line guide of FIG. 1.
Figure 6:
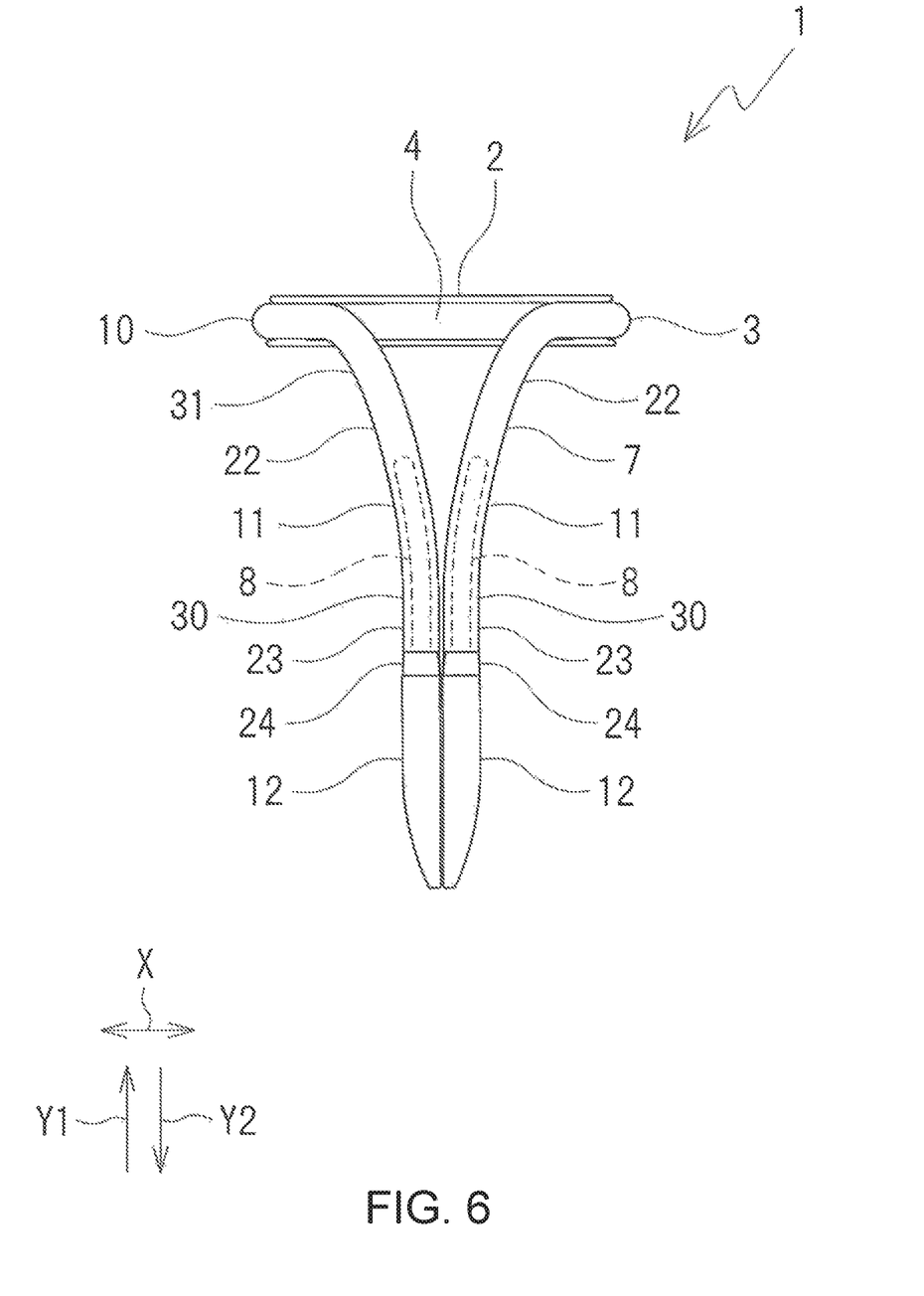
FIG. 6 is a bottom view of the fishing line guide of FIG. 1.
Figure 7:
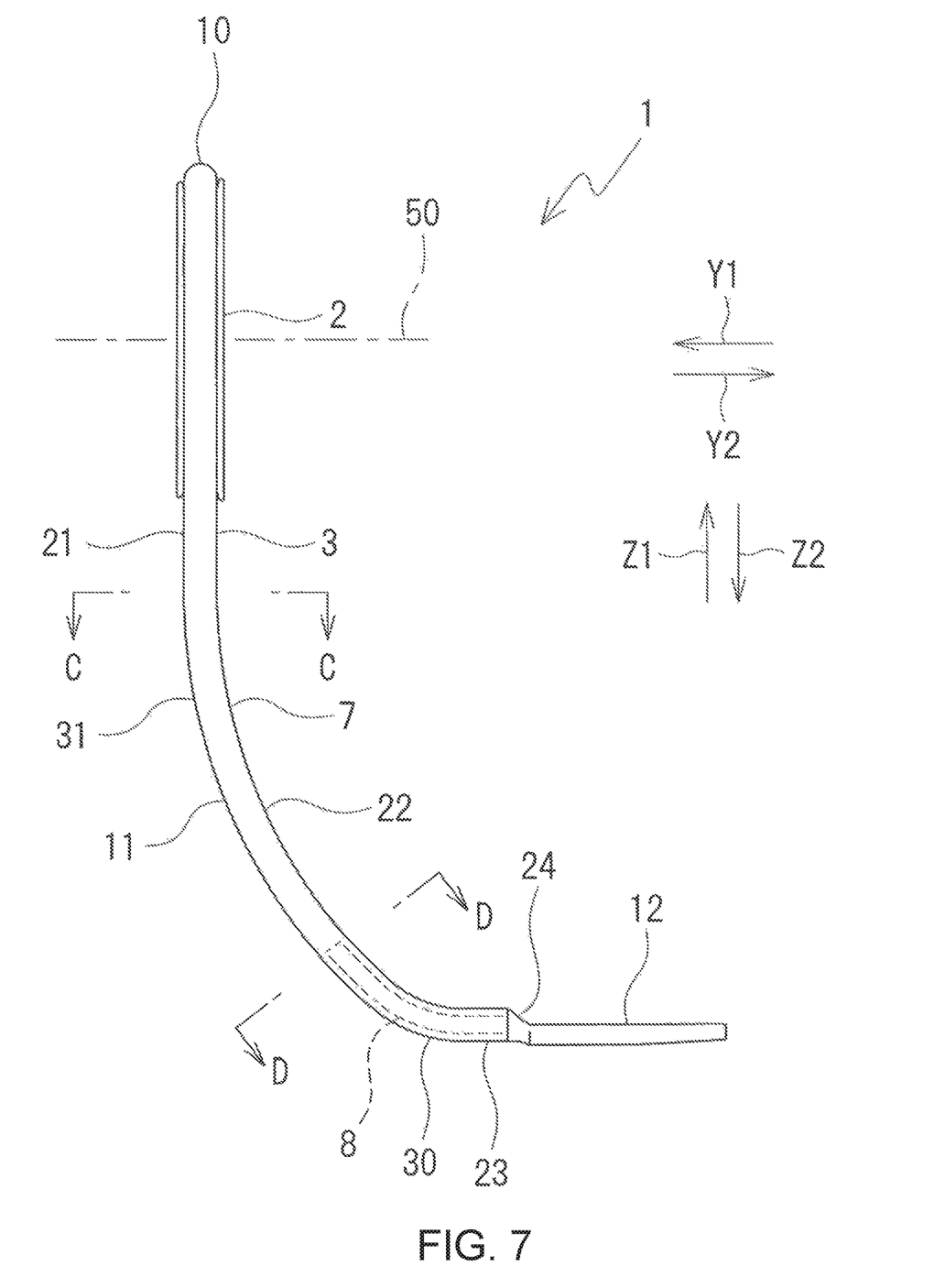
FIG. 7 is a side view of the fishing line guide of FIG. 1.

Next, as shown in FIG. 7, the shape of a supporting leg part 11 viewed from the left-right direction in the side view is described. The supporting leg part 11 has a first leg part 21 continuing from the frame member 10, a second leg part 22 continuing from the first leg part 21, a third leg part 23 continuing from the second leg part 22 and a fourth leg part 24 which connects the third leg part 23 and the attaching leg part 12. The first leg part 21 extends from the end portion of the frame member 10 in the circumferential direction towards the lower side. The first leg part 21 is not curved in the longitudinal direction. The first leg part 21 is located in the same plane as the frame member 10, and is located on a plane perpendicular to the center line 50 of the guide ring 2.

The second leg part 22 connects the first leg part 21 and the third leg part 23. The second leg part 11 occupies most of the entire length of the supporting leg part 11. The second leg part 22 is a curved portion that curves in the longitudinal direction. The end portion of the second leg part 22 on the side of the frame member 10 points in the upward direction. The end portion of the second leg part 22 on the side of the attaching leg part 12 points toward the rear side. The third leg part 23 connects the second leg part 22 and the fourth leg part 24. The third leg part does not curve in the longitudinal direction, and is parallel to the attaching leg part 12 and perpendicular to the frame member 10. The third leg part 23 is positioned higher than the attaching leg part 12, and is parallel to the center line 50 of the guide ring 2. In the area between the first leg part 21 and the third leg part 23, the metal wire is not pressed, and maintains a circular cross-sectional shape.

The fourth leg part 24 connects the third leg part 23 and the attaching leg part 12. The fourth leg part 24 is the boundary portion of the supporting leg part 11 and the attaching leg part 12. The thickness of the fourth leg part 24 in the vertical direction gradually thins in the direction of the attaching leg part 12. That is, the top surface of the fourth leg part 24 is a tilted surface which gradually declines towards the side of the attaching leg part 12. The metal wire of the fourth leg part 24 is pressed in the vertical direction gradually towards the attaching leg part 12. Thus, the cross-sectional shape of the metal wire of the fourth leg part 24 is a flattened shape which is gradually elongated in the left-right direction towards the attaching leg part 12.

Attachment Foots 12

The attachment foots 12 extend from the end portion of the support legs 11 towards the rear side. The attachment foots 12 extend in a straight line along the longitudinal direction, and are parallel to the center line 50 of the guide ring 2. Both ends of the metal wire of the attachment foots 12 are aligned side-by-side, and point toward the rear side. The ends of the metal wire can be joined to each other, for example by welding; however the ends of the metal wire can be joined in any desired manner.

It is preferable that the attachment foots 12 are pressed into a flat shape (i.e., not circular). The attachment foots 12 have a flat shape in which the measurement in the left-right direction is longer than the measurement in the vertical direction. In other words, the metal wires of the attachment foots 12 can pressed down in the vertical direction. The lower surfaces of the attachment foots 12 are concave curved surfaces that are curved in the left-right direction so that the upper side is convex. That is, the upper surfaces of the attachment foots 12 can have a shape corresponding to the lower surfaces of the attachment foots 12, such that the upper surfaces of the attachment foots 12 are convex curved surfaces that are curved in the left-right direction so that the upper side is convex. It is preferable that the curved shape of the lower surfaces of the attachment foots 12 corresponds to the curved surface shape of the outer periphery of the fishing rod in the circumferential direction. The upper surfaces of the attachment foots 12 are lower than the upper surfaces of the third leg parts 23 of the support legs 11. The attachment foots 12 are wound with a winding thread on the outer periphery of the rod body 5 of the fishing rod, as shown in FIG. 11.

Core Member 8

The core member 8 is inserted inside at least one of the pair of the support legs 11 of the frame body 7. In this embodiment, a pair of core members 8 inserted side-by-side in the pair of the support legs 11 of the frame body 7. Preferably there are two core members 8 total. The pair of core members 8 are arranged bilaterally symmetric, such that the pair of the core members 8 have the same length with each other. In the present embodiment, the core members 8 are inserted only in a part of the entire frame body 7. That is, the core members 8 are inserted only in a part of the entire length of the metal wire. It is preferable for the core member 8 to be inserted in at least a part of the supporting leg part 11. In particular, it is preferable for the core member 8 to be inserted in the second leg part 22 of the supporting leg part 11.

Preferably, the core member 8 is made of metal, and more preferably from titanium. In one embodiment, the material of the core member 8 can be different from the material of the frame body 7. In another embodiment, the material of the core member 8 can be the same as the material of the frame body 7. The cross section of the core member 8 is circular having a diameter that corresponds to the inner diameter of the frame body 7. The outer periphery of the core member 8 abuts the inner periphery of the frame body 7. It is preferable that the core member 8 is held at the prescribed position in the frame body 7 by the contact between the core member 8 and the inner periphery of the frame body 7.

The frame body 7 has closed core portions 30 and an open core portion 31. The closed core portions 30 are the sections in which the core member 8 are inserted in the frame body 7. The open core portion 31 is the section where the core members 8 are not inserted in the frame body 7. Thus, the closed core portions 30 are solid and the open core portion 31 is hollow.

It is preferable that the frame member 10 is part of the open core portion 31, and that each supporting leg part 11 is separated into an open core portion 31 and a closed core portion 30. In particular, preferably, the portion of the supporting leg part 11 on the frame member 10 side is an open core portion 31, and the portion of the supporting leg part 11 near the attaching leg part 12 is a closed core portion 30. Even more preferably, it is preferable that the closed core portion 30 is disposed on the second leg part 22 of the supporting leg part 11. In one embodiment, the closed core portion 30 is disposed only in a part of the second leg part 22 of the supporting leg part 11. In one embodiment, the section between the pair of the core member 8 on the frame body 7 can be an open core portion 31. It is preferable for the core member 8 to be inserted in the middle part of the frame body 7, and the section between the core member 8 and the end portions of the frame body 7 to be an open core portion 31.

In detail, a portion of the attaching leg part 12 side of the supporting leg part 11 is a closed core portion 30. More than half of the supporting leg part 11 on the upper side is an open core portion 31, the first leg part 21 is an open core portion 31, the second leg part 22 is separated into an open core portion 31 and a closed core portion 30, the portion of the frame member 10 side on the second leg part 22 is an open core portion 31, and the portion of the attaching leg part 12 side on the second leg part 22 is a closed core portion 30. More than half of the second leg part 22 on the upper side is an open core portion 31, i.e., a large part of the second leg part 22 is an open core portion 31. The portion of the second leg part 22 near the third leg part 23 is a closed core portion 30, and the third leg part 23 is a closed core portion 30. The portion of the third leg part 23 near the fourth leg part 24 can include an open core portion 31, the fourth leg part 24 of the supporting leg part 11 is an open core portion 31, and the attaching leg part 12 is an open core portion 31.

The core members 8 are curved to correspond to the curved shape of the support legs 11. The rear end of the core members 8 are pointing at the rear side, and the front end of the core member 8 point obliquely upward. The core members 8 are located on the curved portions inside the support legs 11, and are located on the second leg parts 22 inside the support legs 11. Therefore, the core members 8 are curved to correspond to the curved shape of the second leg parts 22 of the support legs 11. The core members 8 are held at the prescribed positions in the frame body 7 by frictional resistance against the inner periphery of the frame body 7.

Here, the outline of the manufacturing method of a guide frame 3 is described. First, a frame body 7 is formed from one metal wire. The metal wire is bent into a U shape and curved in the longitudinal direction. The areas near the ends of the metal wire are aligned side-by-side. Then, a pair of the core members 8 is inserted into the frame body 7 from the opening of the ends of the metal wire. As the core members 8 are inserted into the frame body 7, the core members 8 slide on the inner periphery of the frame body 7. The core members 8 curve along the curved shape of the frame body 7 and move toward the frame member 10 side. The frictional resistance between the core member 8 and the inner periphery of the frame body 7 gradually increase as the core members 8 are inserted into the inside of the frame body 7. When the frictional resistance reaches the prescribed value, insertion of the core member 8 is terminated. The core members 8 stay at the prescribed positions due to the frictional resistance against the inner periphery of the frame body 7. Then, portions near the ends of the frame body 7 are pressed down in the vertical direction. After that, the areas of the frame body 7 near both ends are welded to each other.

Spacer 4

The fishing line guide 1 includes a spacer 4. The spacer 4 fills the peripheral groove of the outer periphery of the guide ring 2. As described above, the frame member 10 of the frame body 7 has a C-shape which opens downward. The frame member abuts only to the prescribed angle region on the upper side of the entire circumference of the outer periphery of the guide ring 2. The frame body 7 does not abut to the prescribed angle region on the lower side of the outer periphery of the guide ring 2. The prescribed angle region on the lower side of the outer periphery of the guide ring 2 is not supported by the frame body 7. The space 4 is disposed on the prescribed angle region on the lower side of the outer periphery of the guide ring 2.

The spacer 4 engages the peripheral groove of the outer periphery of the guide ring 2. The space 4 is an arc-shaped rod, such that the spacer 4 has a length which corresponds to the prescribed angle region on the lower side of the outer periphery of the guide ring 2. That is, spacer 4 can have a central angle which corresponds to the prescribed angle region on the lower side of the outer periphery of the guide ring 2. The spacer 4 is adhered to the guide ring 2, and slightly protrudes outward in a radial direction with respect to the guide ring 2. The cross-sectional shape of the spacer 4 is a semicircle such that both ends of the spacer 4 in the circumferential direction approach the frame body 7 of the guide frame 3. However, it is noted that both ends of the spacer 4 in the circumferential direction do not abut the frame body 7. There is a small gap between the ends of the spacer 4 in the circumferential direction and the frame body 7. Preferably, the material of the spacer 4 has a small specific gravity, for example, the spacer 4 can be a hard resin or fiber reinforced resin. The spacer 4 can be formed by injection molding. When the spacer 4 is a fiber reinforced resin, the reinforcement fiber of the fiber reinforced resin is preferably a carbon fiber. In one embodiment, the spacer 4 can be made of metal. It is preferable that the spacer 4 is attached to the guide ring 2 before the guide ring 2 is attached to the guide frame 3. The spacer 4 can be attached to the guide ring 2 after the guide ring 2 is attached to the guide frame 3.

The guide frame 3 of the fishing line guide 1 according to the present embodiment includes a hollow frame body 7 and a core member 8. Thus, it is possible to reduce the weight and ensure the strength of the guide frame 3. The frame body 7 is composed of a single hollow metal wire. Thus, it is possible to reduce the weight of the guide frame 3. When core members 8 are inserted in the support legs 11, the strength of the support legs 11 can be improved. When the core members 8 are inserted in the second leg parts 22 of the support legs 11, the second leg parts 22 can be reinforced. When the core members are located on the second leg parts 11 of the support legs 11 and curved, the core members 8 are stabilized. Moreover, when the core members 8 are held by the second leg parts 22 of the frame body 7 due to the frictional resistance against the inner periphery of the frame body 7, the core members 8 are stabilized. This embodiment can especially preferable because the core members 8 do not move toward the side of the frame body 10.

When the frame body 7 has closed core portions 30 and an open core portion 31, it is possible to reduce the weight and ensure the strength of the guide frame 3, especially when the frame member 10 has an open core portion 31. Further, the weight of the guide frame 3 can be reduced when: 1) the portion of the frame member 10 side on the supporting leg part 11 is an open core portion 31, 2) more than half of the supporting leg part 11 on the upper side is an open core portion 31, and/or 3) the attaching leg part 12 is an open core portion 31.

When the frame body 7 has a closed core portion 30 near the attaching leg part 12 on the supporting leg member 11, the supporting leg part 11 can be efficiently reinforced. Also, the strength of the root portion near the attaching leg part 12 of the supporting leg part 11 can be improved. By using a thin metal wire for the frame body 7, bending the frame body 7 is easy to perform and the diameter of the guide ring 2 can be reduced. Even when a thin metal wire is used for the frame body 7, it is possible for the core member 8 to effectively reinforce the portion which needs strength.

The attaching leg part 12 can be stably attached to the fishing rod as the entire attaching leg part 12 is pressed down in the vertical direction. The attaching leg part 12 can be easily pressed and flattened as the attaching leg part 12 is an open core portion 31.

What is claimed is:

1. A guide frame of a fishing line guide, the guide frame comprising:

a hollow frame body composed of a single metal wire having a first end and a second end joined to each other; and a core member inserted into the frame body, the frame body including a frame member configured to abut a guide ring, a first attachment foot disposed at the first end of the single metal wire, a second attachment foot disposed at the second end of the single metal wire, the first and second attachment feet configured to attach to a fishing rod, and a support leg including a hollow portion, only a portion of the hollow portion receiving the core member, the first and second attachment feet being unitary with the frame member and the core member being a separate element from both the frame member and the first and second attachment feet.

2. The guide frame of the fishing line guide according to claim 1, wherein the support leg has a curved portion and the core member is inserted into the curved portion of the support leg.

3. The guide frame of the fishing line guide according to claim 1, wherein the core member is held at prescribed positions on the frame body due to contact between the core member and an inner periphery of the frame body.

4. The guide frame of the fishing line guide according to claim 1, wherein the hollow portion of the support leg has a closed core portion and an open core portion, and the portion of the hollow portion receiving the core member being the closed core portion and not the open core portion.

5. The guide frame of the fishing line guide according to claim 4, wherein the open core portion is disposed in the frame member.

6. The guide frame of the fishing line guide according to claim 5, wherein the open core portion is disposed in portions of the support leg adjacent the frame member.

7. The guide frame of the fishing line guide according to claim 6, wherein the closed core portion is adjacent each of the first and second attachment feet disposed at each of the first and second ends of the single metal wire.

8. The guide frame of the fishing line guide according to claim 7, wherein the open core portion is disposed in each of the first and second feet.

9. The guide frame of the fishing line guide according to claim 8, wherein each of the first and second attachment feet is pressed down and flattened.

10. The guide frame of the fishing line guide according to claim 1, wherein the frame body is formed from a material that is different from a material of the core member.

11. A fishing line guide comprising:

a guide ring for guiding a fishing line, and the guide frame according to claim 1 and configured to hold the guide ring.

12. A fishing rod including the fishing line guide according to claim 11.

13. The guide frame of the fishing line guide according to claim 1, wherein one end of the core member is disposed adjacent at least one of the first and second attachment feet.

14. The guide frame of the fishing line guide according to claim 1, wherein the core member is formed from a material configured to reinforce the support portion.

* * * * *